June 17, 1958
W. L. HENDRIX
2,839,597
AERIAL CABLE CLAMP
Filed July 11, 1955
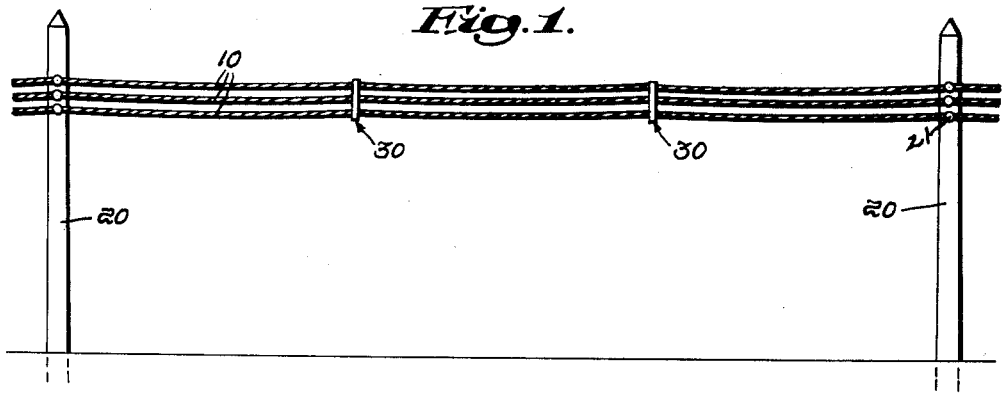
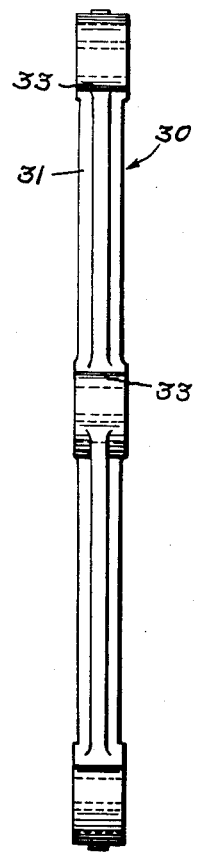
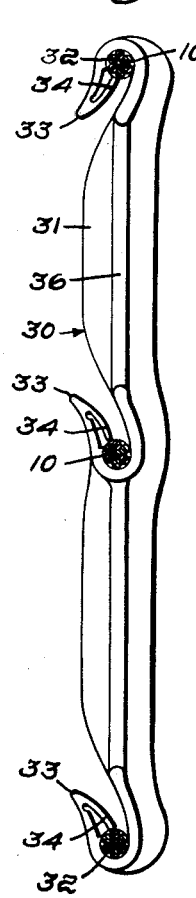
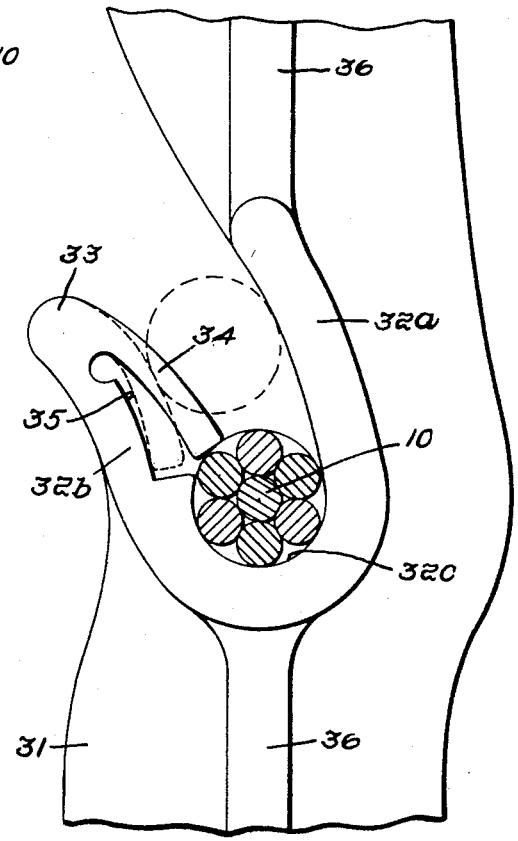
Inventor:
William L. Hendrix,
by Emery, Booth, Townsend, Miller & Weidner
Attys United States Patent Office
2,839,597
Patented June 17, 1958

2,839,597

AERIAL CABLE CLAMP

William L. Hendrix, Brighton, Mass.

Application July 11, 1955, Serial No. 521,290

3 Claims. (Cl. 174—146)

This application relates generally to electric power transmission and more particularly to cables and clamps of the type disclosed and described in my copending applications Serial No. 250,003, filed Oct. 5, 1951, and Serial No. 512,600, filed June 2, 1955, now Patent No. 2,820,083, and comprising a plurality of electrical conductors and means for firm support and insulating spacing of the same uniformly along the cable length. The aerial cable class to which this invention applies is defined and distinguished further and more particularly by conductors characterized by light or no insulation, and novelly by hanger-spacer members firmly engaging and rigidly ordering the cable wires, and affording their self-support, positive positioning and insulating spacing intermediate the wire supporting poles.

In its present embodiment, my invention provides an improved aerial cable adapted particularly for secondary distribution circuits such as conventionally carry 120 or 240 volts. It aims to provide for such circuits a cable which is light weight, and more easily and cheaply manufactured, installed, and serviced. The invention aims further and more particularly to provide an aerial cable distinguished by insulation free wires. The still further invention object is the provision of novel clamp means for the cable supporting, strengthening and insulating engaging and ordering of the conductor wires intermediate the supporting poles. The invention aims also to provide novelly for making service taps mid span, or intermediate the poles, and without requiring the cutting of the wires.

The invention will be better understood from a consideration of the following specification taken in conjunction with the accompanying drawing in which:

Fig. 1 shows a typical span of a secondary distribution circuit according to the invention;

Fig. 2 is a rear elevation of a hanger-spacer element of the the invention;

Fig. 3 is a side view of the hanger-spacer element of Fig. 2 and showing it in operative association with the wires of my novel aerial cable; and Fig. 4 is a larger scale view of a portion of the hanger-spacer element of Figs. 2 and 3, and illustrating more particularly its manipulation for assembly and disassembly with the cable wires.

Conventionally the secondary distribution circuits here principally concerned, carrying 120 or 240 volts as above noted, comprise three parallel, vertically spaced wires strung or supported from insulators carried by lateral spaced poles. The vertical spacing of the wires, as limited between pole height and required ground distance, is typically 8 in. A convenient and economical pole spacing might be two house lot widths, say 160–180 ft.

It will be readily appreciated that in an installation such as just described the cable wires are capable of closing and contacting intermediate the poles at least under extreme wind and weather conditions. Accordingly, the conventional aerial cables will be understood to employ covered or insulated conductors such as required to prevent shorting out by the mentioned closing and contacting.

Those skilled in the art will appreciate further that service to dwelling and the like structures are generally desired or required to overlie only the property associated with the particular structure and that service taps have heretofore been made only at and from the poles. Accordingly in the prior or conventional practice also the installation of a pole has been required for every service connection.

My present invention will be understood to provide a new and improved aerial cable characterized by the use of lighter and less expensive bare wires and also by suitability for midspan service taps. This invention will be seen further to provide a simple and efficient clamp device novelly designed and constructed as the hanger-spacer of the aerial cable herein disclosed and adapted also and variously to support and anchor the similar multiple conductor element assemblies.

Referring now to Fig. 1 of the drawing, an illustrative span of a representative secondary circuit installation of the invention is there shown to comprise the wires 10 supported at the usual vertical interval from poles 20 of usual height and arranged at usual span distance. In accordance with the invention novel hanger-spacer elements 30 are provided and engaged with the wires 10 intermediate the poles 20, whereby the wires are positively positioned in ordered insulatively spaced array throughout the span length, and the necessity for insulating the wires is eliminated.

Accordingly, and referring now to Figs. 3 and 4, my novel aerial cable employs bare wire conductors 10 comprising generally and merely a plurality of spiral wound strands, commonly seven in number, of light weight conductive wire, preferably aluminum, and such as may be designated commercially as No. 4/0 or No. 1/07 strands all aluminum bare. For the uppermost or messenger wire, a 6/1 or steel core wire may, of course, be employed. Those skilled in the art will appreciate that the use of bare wire conductors as just described reduces wire costs for secondary circuits by more than half.

The novel clamp or hanger-spacer means 30 of the invention is illustrated in Figs. 2–4 and there shown to comprise more particularly a unitary bar or clamp element 31 fashioned of a rigid, light weight, non-reactive insulating material, such as a plastic of the acrylic resin class. I may employ for example materials such as known commercially as "Lucite" and "Plexiglas," and such as best combine the superior weather resisting qualities as well as the high mechanical and electrical strength desired for the wire holding member.

In accordance with the invention the integral, unitary bar or clamp 31 is formed to present a plurality of recesses 32 arranged at the similar vertical ordering and spacing as the wire carrying pole insulators 21, and shaped and formed to receive and seat the conductors 10. The conductor receiving recesses 32 are defined more particularly by generally parallel sides 32a, 32b merging inwardly or interiorly at a rounded bottom 32c, which may be proportioned snugly to embrace the conductor 10, and whereby the recesses are constituted as of general U-shape. It will be appreciated that the sides 32a, 32b of the upper or messenger engaging and hooking recess are inclined downwardly outwardly, and that those of the intermediate and lower recesses are inclined upwardly outwardly, for seating and supporting the lower or conductor wires 10. Commonly, however, the one or inner of the recess sides 32a, 32b is continuous with the intermediate longitudinal clamp margins, and the other or outer side terminates in a projecting flange or lip 33.

Integrally mounted and supported from each of said projecting lips 33 is a snap or spring fastener or detent comprising a resilient arm or finger 34 extending inwardly and upwardly or downwardly towards the recess bottom 32c. The spring fingers 34 will be seen to extend normally to engage against or abut endwise the seated wires 10 and to close or lock the recesses against the removal of the same. Further in accordance with the invention, the outer recess sides 32b are undercut intermediate the lips 33 and recess bottom 32c by the keyhole slot recessing 35, Fig. 4, permitting the retraction and flush reception of the fingers into the recess outer sides 32b, and facilitating also the desired retraction or collapse of the spring fingers 34. The proportioning of the parts and more particularly the spacing of the recess sides 32a, 32b will be seen to be such as to require this collapse of the fingers 34 into the dotted line position, Fig. 4, for passage sidewise of the wires 10 to the recess bottoms 32c.

Further to the invention, the hanger-spacer means 30 are seen to be fashioned for minimum weight consistent with desired strength and rigidity, as by defining the same as a thin straight element of general strip or bar form, and forming integrally and at its opposite sides the thin straight longitudinal strengthening ribs 36. Desired firmness and stability of engagement about the cable wires may also be promoted by widening or thickening the seats or sockets, and similarly as the ribs 36, which may conveniently extend continuously therewith, as shown.

The manner of assembly of my novel cable and more particularly of the installation of the hanger-spacer members 30 on the cable wires 10 will be readily apparent to those skilled in the art. The clamp 31 is first hung on the messenger, by hooking the upper recess 32 over the same. The conductors are then raised as necessary to clear the intermediate and lower lips 33, and then dropped or placed in the corresponding seats 32, and for locking engagement behind the fingers 34. The retraction or collapse of the fingers 34, as for disassembly of my novel cable, may readily be accomplished and by manual or finger pressure.

My invention has been shown further to provide novel means for ordering the positive positioning and spacing of the wires throughout the span length. Those skilled in the art will appreciate that the use as described of my novel hanger-spacer element together with the insulation-free wires permits also the making of service taps without cutting the wires or installing extra poles, as heretofore required for mid span house and other service installations.

It will be understood that my invention is not limited to the particular embodiments thereof illustrated or described herein, and I set forth its scope in my following claims:

1. A hanger-spacer clamp for the conductors of an aerial electric power cable comprising a rigid unitary light weight insulating bar, annular conductor seats recessed in said bar, said seats formed with parallel side and rounded bottom walls and of a shape and width for firmly engaging about the conductors, spring fingers supported at the side and for normal projection inwardly over the bottom walls of said seats, said spring fingers adapted to be retracted to expose said bottom walls, and recesses in said side walls, said recesses adapted for flush reception of said spring fingers.

2. A hanger-spacer clamp according to claim 1 wherein said bar has an upper downfacing seat for engaging and hooking over the messenger and lower upfacing seats for supporting and insulatively spacing the conductors of said cable.

3. A hanger-spacer clamp for an aerial electric power cable of the secondary distribution type described comprising a rigid light weight unitary bar adapted to span the cable conductors and integrally formed of non-reacting, non-conducting material, annular recesses within the bar at and intermediate the ends thereof, said recesses proportioned at their side walls for sidewise entry and removal and at their bottom walls for snugly embracing the cable conductors, and detent means at one side wall and normally projecting toward the other side wall of said recesses and thereby rigidly confining and positively locking said conductors in and against escape from the bar recesses, said detent means shiftable away from said other and to said one of said side walls and whereby to clear said recesses for said sidewise entry and removal of said conductors.

References Cited in the file of this patent

UNITED STATES PATENTS

| | | |
|---|---|---|
| 289,165 | Strohm | Nov. 27, 1883 |
| 810,004 | Tabler | Jan. 16, 1906 |
| 1,334,545 | Londelius | Mar. 23, 1920 |
| 2,144,872 | Cruser | Jan. 24, 1939 |
| 2,182,968 | Lunsford | Dec. 12, 1939 |
| 2,417,244 | Eggert | Mar. 11, 1947 |
| 2,650,948 | Findlay | Sept. 1, 1953 |

FOREIGN PATENTS

| | | |
|---|---|---|
| 659,728 | Great Britain | Oct. 24, 1951 |